Figure 1:
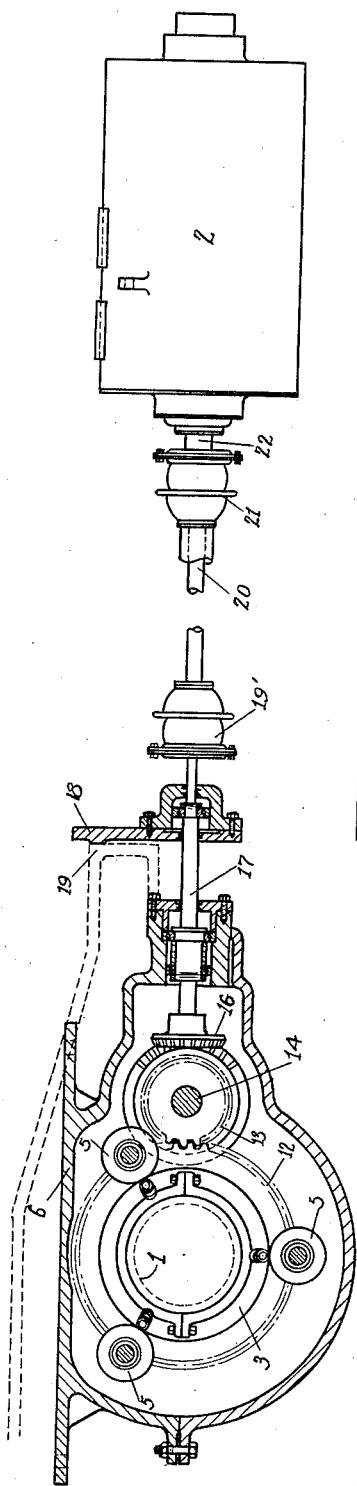

H. PENDER.
POWER TRANSMISSION MECHANISM.
APPLICATION FILED MAY 5, 1919.

1,367,625.

Patented Feb. 8, 1921.
2 SHEETS—SHEET 1.

INVENTOR
H. Pender
BY
Duell, Warfield & Duell
ATTORNEY

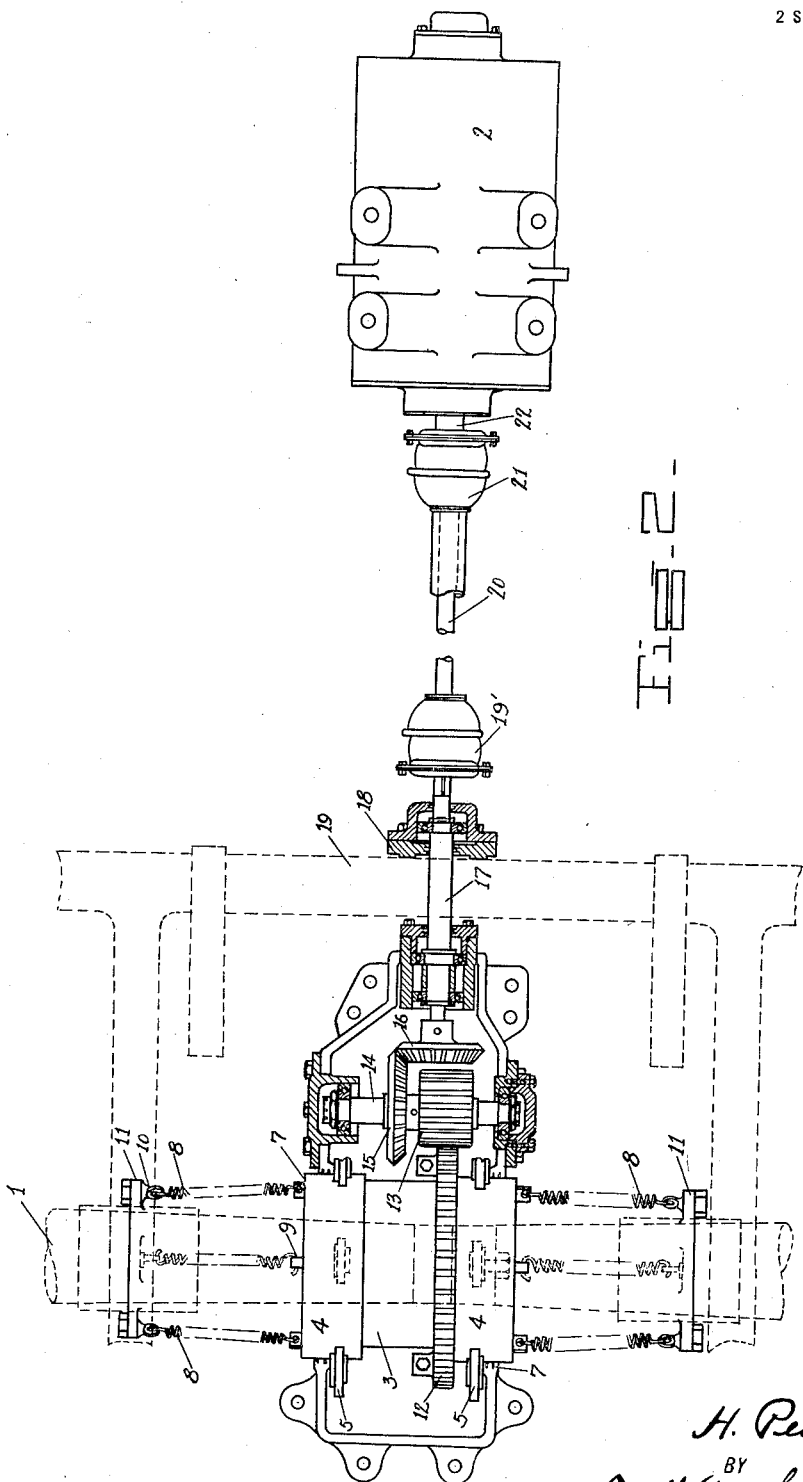

UNITED STATES PATENT OFFICE.

HAROLD PENDER, OF MERION, PENNSYLVANIA, ASSIGNOR TO SAFETY CAR HEATING & LIGHTING COMPANY, A CORPORATION OF NEW JERSEY.

POWER-TRANSMISSION MECHANISM.

1,367,625.   Specification of Letters Patent.   Patented Feb. 8, 1921.

Application filed May 5, 1919. Serial No. 294,933.

*To all whom it may concern:*

Be it known that I, HAROLD PENDER, a citizen of the United States, residing at Merion, in the county of Montgomery and State of Pennsylvania, have invented certain new and useful Improvements in Power-Transmission Mechanism, of which the following is a full, clear, and exact description, such as will enable others skilled in the art to which it appertains to make and use the same.

This invention relates to transmission mechanism for driving a variable speed generator from a car axle, and for other purposes under similar conditions.

It is one of the objects of the invention to provide a simple and improved construction and assembly of parts for establishing an efficient driving connection between a rotating axle and a gear mounted to turn about a longitudinal axis which may be non-coincident with the axis of the axle.

It is a further object to provide an improved mechanism of the character mentioned with an elimination of belts and pulleys, and wherein liability of injury or displacement of the parts is substantially prevented.

Another object is to provide a structurally superior and functionally advantageous combination of elements to transmit driving power from a car axle to an electric generator.

Other objects and advantages will be in part noted hereinafter in connection with the following description of the accompanying drawings, which illustrate a typical embodiment of the invention, and in which—

Figure 1 is a side view, partially in section, of the driving connection and assembly from a car axle to a generator; and Fig. 2 is a top view thereof, partially in section, with certain parts of the car truck indicated in dotted lines.

In railway car lighting systems it is common to employ a variable speed generator driven from a car axle to supply current to a storage battery and to lamps, and it is desirable, in certain respects, to provide such drive through mechanical connections without belts or similar devices which are not well adapted to withstand the hard service imposed on such systems and which are otherwise objectionable. It is noted, however, that the car axles, which are generally used as the prime mover, are not finished to accurate concentricity, and moreover are subject to lateral and vertical displacement with respect to any fixed point on the car truck or body while the train is running.

The present invention is directed to the provision of an efficient positive drive from a car axle to a rotary gear supported independently of the axle, and from thence to the generator. It is to be understood, however, that certain features of the invention are capable of embodiment or use in other relations, and that certain sub-combinations of the elements hereinafter described may constitute advantageous coöperable combinations in other structures for like purposes. It is also noted that certain of the subject-matter illustrated in the drawings is described more fully and claimed in the copending application of George E. Hulse, filed May 6, 1919, Serial No. 295,190.

Referring more particularly to the drawings, there is shown a car axle 1 constituting the prime mover, and a variable speed electric generator 2 driven from the axle and adapted for rigid mounting from the under side of the car body frame, or, if desired, on the car truck. Surrounding the axle 1, according to the present invention there is provided a tubular drum 3 having an interior dimension such that there may be some radial clearance between the drum and the axle. The drum is also provided with one or more, in the present instance two, end exterior surfaces 4 finished to concentricity and against which a plurality of symmetrically spaced rollers 5 are adapted to bear. The rollers 5 are supported on stubs mounted in the side walls of the casing 6 which incloses the drum 3 and the other gears, as will be described. This casing 6 may be rigidly mounted on the car truck and positioned so that the rollers 5 support the drum 3 concentric to a relatively fixed axis independently of the axle 1. The bearing portions 4 of the drum also project through the sides of the casing and an oil-retaining bearing 7 is provided therebetween. Flexible members are employed to transmit the rotary motion of the axle to the drum, and for this purpose a plurality of coil springs 8 are stretched beween symmetrically spaced extending lugs 9 at the end of the drum and lugs 10 on collars 11 clamped or otherwise fixedly secured to the axle 1 adjacent the car wheels. The collars 11 are preferably split diametrically, so that they may be readily fastened to the car axles, and it will be observed that true concentricity of the collars with respect to the axis of the car wheels is unnecessary. The springs 8 at the two ends of the drum are balanced and are properly designed to effectively, but somewhat resiliently, transmit rotary drive from the axle to the drum, while, however, permitting a relative longitudinal displacement between the latter and the axle, so that side sway of the axle or its other displacement in a horizontal or other plane is permitted without disturbing the drive or the predetermined axis of rotation of the drum. Such longitudinal displacement is further permitted by the wide tracks 4 of the drum against which the rollers 5 bear. For purposes of convenient mounting the drum 3 is transversely split and intermediate the ends thereof there is provided a large gear 12, also preferably split and adapted for rigid attachment to the drum.

From the gear 12 power is transmitted to a meshing smaller but wider pinion 13 keyed on a counter-shaft 14 extending parallel to the axis of rotation of drum 3 and journaled in bearings through the side walls of the casing 6. Also keyed to the counter-shaft 14 and in fixed longitudinal relation to the gear 13 there is provided a bevel gear 15 arranged to mesh with a corresponding but smaller bevel gear 16 fixed to the inner end of an intermediate driving shaft 17, the latter being journaled at one end, through the casing 6, and at the other through a supporting plate 18 attached to the truck end sill 19. The shaft 17 is, in turn, connected, through a universal joint 19′, to one end of a multi-part extensible shaft 20, the opposite end of the latter being also connected, through a universal joint 21, to the armature shaft 22 of the generator 2. Shaft 20, as mentioned, comprises two parts suitably connected to rotate together and telescopically relatively movable so that the decrease or increase in distance from the axis of motion of the drum 3 to the fixed extremity of the generator shaft 22 is permitted. The universal joints 19′ and 21 also allow angular displacement between the axis of shaft 17 and the generator shaft 22 without disturbing the drive.

As appears more fully in the application of George E. Hulse hereinabove referred to, the casing 6 may preferably be horizontally divided and comprise an upper section and a lower complementary section adapted for attachment by bolts to inclose the several gears and to afford bearings for the counter-shaft 14 and the driving shaft 17, whereby removal of the lower section of the casing may be readily accomplished for inspection of the gearing, or when otherwise desired.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In combination, a rotative axle, a tubular member thereabout, supporting means for said member allowing its endwise movement but about a fixed axis of rotation only, and means connecting said axle and member to transmit turning movement from the former to the latter.

2. In combination, a rotative axle, a tubular member thereabout and spaced therefrom, unyielding supporting means for said member allowing its endwise movement about a fixed axis of rotation and resilient means connecting said axle and member to carry the latter rotatively and endwise with the former.

3. In combination, a rotative axle, a tubular member thereabout and spaced therefrom, an external gear on said member, means independent of said axle to hold said member concentric to a relatively fixed axis, and resilient means connecting said axle and member to transmit turning movement from the former to the latter.

4. In combination, a rotative axle, a tubular member thereabout carrying a gear, rigid supporting means for said member allowing its endwise movement about a fixed axis of rotation and opposed resilient means connecting each end of said member to said axle for transmitting rotative and endwise movement from said axle to said member.

5. In combination, a rotative axle, a tubular member thereabout and spaced therefrom and having an external gear, and means including a plurality of coil springs stretched between the ends of said member and said axle to transmit turning movement from the one to the other.

6. In combination, a rotative axle, a tubular member thereabout and spaced therefrom and supported independently of said axle to turn about a fixed longitudinal axis, and means including a plurality of balanced extensible springs to transmit rotary movement from said axle to said member while permitting relative longitudinal displacement thereof.

7. In combination, a rotative axle, a tubular member thereabout and spaced therefrom and having a relatively wide bearing track, and a plurality of circumferentially spaced elements bearing against said track and holding the said member concentric to a relatively fixed axis.

8. In combination, a rotative axle, a tubular member thereabout and spaced therefrom and having a relatively wide bearing track, and a plurality of circumferentially spaced elements bearing against said track and holding the said member concentric to a relatively fixed axis while permitting relative endwise movement of said member during its rotation.

9. In combination, a rotative axle, a tubular member thereabout and spaced therefrom and having two longitudinally spaced relatively wire external bearing tracks, and a plurality of circumferentially spaced elements bearing against each of said tracks and holding said member concentric to a relatively fixed axis.

10. In combination, a rotative axle, a split tubular drum thereabout, a split gear secured to said drum, a horizontally split casing inclosing said drum and gear, means carried by said casing to hold said drum concentric to a relatively fixed axle while permitting relative longitudinal displacement between said casing and said drum, and resilient connection to transmit rotary movement from said axle to said drum and to yieldingly resist relative longitudinal displacement therebetween.

11. In combination, a rotative axle, a spaced member encompassing said axle and stretched springs between the ends of said member and said axle and disposed approximately parallel to the latter for transmitting turning movement from said axle to the said member.

12. In combination, a rotative axle, a spaced member encompassing said axle, an external gear carried by said member, resilient means to transmit turning and endwise movement from said axle to said member, a gear engaging said first mentioned gear and supporting means holding said second mentioned gear against movement in the direction of its axis.

13. In combination, a rotative axle, a spaced member encompassing said axle, longitudinally spaced bearing tracks on said member, bearing members coöperating with said tracks and resilient connections from said axle to said member to transmit turning movement therebetween.

14. In combination, a truck frame and an axle rotatively mounted thereon, a rotatable shaft on said frame having a gear thereon, a rotatively mounted member having a relatively fixed axis of rotation and having an external gear slidably meshing with said first mentioned gear, one of said gears being relatively narrow and the other relatively wide, and means adapted resiliently to transmit turning and endwise movement between said axle and said member.

In testimony whereof I affix my signature, in the presence of two witnesses.

HAROLD PENDER.

Witnesses:
  EDNA KILLIAN,
  C. E. CLEWEN.